(12) United States Patent
Jost et al.

(10) Patent No.: US 7,653,089 B2
(45) Date of Patent: *Jan. 26, 2010

(54) METHODS AND APPARATUS FOR RECONFIGURING PROTOCOL DATA WHEN REDUCING MULTIPLEXED DATA STREAMS

(75) Inventors: Arthur P. Jost, Mt. Laurel, NJ (US); Erik Elstermann, Carlsbad, CA (US); Jeffrey D. Kuczynski-Brown, Elkins Park, PA (US); Richard DiColli, Broomall, PA (US); Jeffrey Paul Viola, Glen Mills, PA (US)

(73) Assignee: General Instrument Corporation, Horsham, PA (US)

( * ) Notice: Subject to any disclaimer, the term of this patent is extended or adjusted under 35 U.S.C. 154(b) by 611 days.

This patent is subject to a terminal disclaimer.

(21) Appl. No.: 11/021,768

(22) Filed: Dec. 23, 2004

(65) Prior Publication Data

US 2005/0105564 A1    May 19, 2005

Related U.S. Application Data

(63) Continuation of application No. 09/800,835, filed on Mar. 7, 2001, now Pat. No. 6,847,659.

(51) Int. Cl.
*H04J 1/00* (2006.01)

(52) U.S. Cl. .................. 370/485; 370/486; 370/537; 370/538; 370/536

(58) Field of Classification Search .............. 370/485, 370/486, 537, 538, 466, 465, 474, 389, 477, 370/391, 536; 725/101, 34, 70, 89, 68, 139, 725/134, 38; 348/731, 423, 472
See application file for complete search history.

(56) References Cited

U.S. PATENT DOCUMENTS 5,812,760 A * 9/1998 Mendenhall et al. .......... 714/49
5,835,493 A * 11/1998 Magee et al. .......... 370/395.62
6,148,082 A   11/2000 Slattery et al.
6,359,883 B1 * 3/2002 Lechleider .................. 370/389

(Continued)

FOREIGN PATENT DOCUMENTS

WO           98/16067        4/1998

OTHER PUBLICATIONS

Cartwright, C.T., "Issues in Multiplex and Service Management in Digital Multichannel Broadcasting", International Broadcasting Convention, Sep. 1997, pp. 308-313.

(Continued)

*Primary Examiner*—Ayaz R Sheikh
*Assistant Examiner*—Chuong T Ho
(74) *Attorney, Agent, or Firm*—Stewart M. Wiener

(57) ABSTRACT

The present invention provides methods and apparatus for reconfiguring protocol data for a multiplexed data stream which is reduced to carry fewer services for cable-side transmission in a cable television plant or the like. More particularly, the present invention provides methods and apparatus for reconfiguring protocol data for a desired combination of data streams contained within an incoming high data rate multiplexed data stream, such as a high data rate Quadrature Phase Shift Keying (QPSK) modulated multiplexed data stream, when the incoming multiplexed data stream is reduced.

16 Claims, 7 Drawing Sheets

U.S. PATENT DOCUMENTS

| | | | |
|---|---|---|---|
| 6,424,714 B1 * | 7/2002 | Wasilewski et al. | 380/200 |
| 6,466,592 B1 * | 10/2002 | Chapman | 370/537 |
| 6,477,185 B1 * | 11/2002 | Komi et al. | 370/536 |
| 6,598,233 B1 * | 7/2003 | Choi | 725/151 |
| 6,765,961 B2 * | 7/2004 | Segawa et al. | 375/240.01 |
| 6,771,657 B1 * | 8/2004 | Elstermann | 370/465 |
| 6,847,659 B2 * | 1/2005 | Jost et al. | 370/537 |
| 6,934,303 B2 * | 8/2005 | Vince et al. | 370/485 |
| 2004/0181800 A1 * | 9/2004 | Rakib et al. | 725/25 |
| 2004/0181811 A1 * | 9/2004 | Rakib | 725/122 |

OTHER PUBLICATIONS

Wasilewski, Anthony J., "The MPEG-2 Systems Specification: A Common Transport for the Digital Highway", Annual Review of Communications, National Engineering Consortium, 1997, pp. 785-795.

"ETR 211: Digital Video Broadcasting (DVB); Guidelines on implementation and usage of Service Information (SI)", ETSI Technical Report, Aug. 1997, pp. 1-42.

* cited by examiner

METHODS AND APPARATUS FOR RECONFIGURING PROTOCOL DATA WHEN REDUCING MULTIPLEXED DATA STREAMS

This application is a continuation of commonly assigned U.S. patent application Ser. No. 09/800,835, filed Mar. 7, 2001, now U.S. Pat. No. 6,847,659

BACKGROUND OF INVENTION

The present invention relates generally to the field of digital communications, such as the communication of television, multimedia, and/or interactive entertainment and information signals. In particular, the present invention provides methods and apparatus for reconfiguring protocol data for a multiplexed data stream that is reduced to carry fewer services for, e.g., cable-side transmission via a cable television plant. More particularly, the present invention provides methods and apparatus for creating protocol data corresponding to a desired pre-defined combination of multiplexed data stream subgroups contained within an incoming high data rate data stream, such as a high data rate Quadrature Phase Shift Keying (QPSK) modulated multiplexed data stream, when the incoming multiplexed data stream is to be reduced.

When processing high data rate satellite data feeds, it is often necessary to reduce the multiplexed data streams, e.g., for a cable-side multiplex. When reducing a high data rate data stream, some services (such as certain cable television channel services) are dropped. Only a subset of the services in the incoming high data rate data stream may appear in the reduced cable-side output data stream. Therefore, any original protocol data built for the incoming high data rate data stream may no longer be valid for the reduced multiplex.

It would be advantageous to provide methods and apparatus which allow a cable or satellite television headend decoder/transcoder to create and output protocol data which correctly corresponds to the services in the reduced output data stream. It would be further advantageous to provide a high data rate data stream which comprises a predefined set of data stream subgroups, each of the subgroups containing a plurality of services. It would be even further advantageous to provide predefined combinations of the data stream subgroups, each of which predefined combination produces a data stream with a desired reduced data rate. It would be still further advantageous to provide hidden Program Association Tables (PATs), each of which corresponds to a predefined combination of data stream subgroups, as well as hidden protocol data (HPD) base packet identifier (PID) streams corresponding to each hidden PAT, each HPD base PID stream identified by a unique pre-defined PID. The provision of the hidden PATs enable the selection of a hidden PAT corresponding to the desired subgroup combination, for output with the desired subgroup combination as part of the reduced cable-side data stream. The provision of the HPD base PID streams enable the selection of protocol data corresponding to the desired subgroup combination, for output with the desired subgroup combination as part of the reduced cable-side data stream.

The methods and apparatus of the present invention provide the aforesaid and other advantages.

SUMMARY OF THE INVENTION

The present invention provides methods and apparatus for reconfiguring protocol data for a multiplexed data stream which is to be reduced for cable-side transmission in a cable television plant or the like. More particularly, the present invention provides methods and apparatus for reconfiguring protocol data for a desired pre-defined combination of multiplexed data stream subgroups contained within an incoming high data rate data stream, such as a high data rate Quadrature Phase Shift Keying (QPSK) modulated multiplexed data stream, when the incoming multiplexed data stream is to be reduced.

It should be appreciated that although the invention is disclosed in connection with a cable television implementation, the invention is not limited to such an embodiment, and can be used for other digital data communication applications where corrected protocol data or similar constructs are required for a data stream that has been reduced.

In an example embodiment of the invention, protocol data is reconfigured when reducing a multiplexed data stream. A transcoder is provided which receives an inbound multiplexed data stream. The multiplexed data stream may contain: (1) a plurality of data streams, each of which carries a service; (2) a protocol data set defining the plurality of data streams; and (3) one or more hidden protocol data sets, each hidden protocol data set associated with a predefined combination of the plurality of data streams. A processor is associated with the transcoder and configured to: (a) receive the protocol data set defining the plurality of data streams and the one or more hidden protocol data sets; (b) select one of the hidden protocol data sets corresponding to a desired combination of data streams; and (c) direct the transcoder to output the desired combination of data streams and the selected hidden protocol data set.

The protocol data set defining the plurality of data streams may comprise: an all-inclusive program association table (PAT) identified by a first packet identifier (PID); and an all-inclusive protocol base PID stream identified by a second PID. Each of the hidden protocol data sets may comprise: a hidden PAT associated with one of the predefined combinations of the plurality of data streams and identified by a PID chosen from a first group of PIDS; and a hidden protocol data (HPD) base PID stream corresponding to the hidden PAT, each HPD base PID stream identified by a PID chosen from a second group of PIDS.

The selection of one of the hidden protocol data sets by the processor may comprise a selection of one hidden PAT corresponding to the desired combination of data streams. The processor may determine a protocol data makeup of the desired combination of data streams from the HPD base PID associated with the selected hidden PAT. The processor may then re-map the selected hidden PAT to a first predetermined PID, and re-map the HPD base PID stream corresponding to the selected hidden PAT to a second predetermined PID. The transcoder may output the re-mapped PAT and the re-mapped HPD base PID stream with the desired combination of data streams. The first predetermined PID may be the PID of the all-inclusive PAT. The second predetermined PID may be the PID of the all-inclusive protocol base PID stream.

The plurality of data streams may be from a plurality of sources. The plurality of data streams may comprise a plurality of multiplexed data stream subgroups. In such an embodiment, each hidden protocol data set may be associated with a predefined combination of the multiplexed data stream subgroups.

The transcoder may output the desired combination of data streams and the selected hidden protocol data set in an intermediate frequency data stream having one of: (i) a maximum data rate of about 27 Mbps; or (ii) a maximum data rate of about 38.8 Mbps.

Each hidden protocol data set may contain at least one of a system time table (SST), ratings region table (RRT), a master guide table (MGT), and a virtual channel table (VCT) for those services present in the associated combination of the plurality of data streams.

The protocol data set defining the plurality of data streams, any hidden protocol data sets which were not selected, and any data streams not contained in the desired combination may be discarded.

In a further example of the present invention, the inbound multiplexed data stream may contain: a plurality of pre-defined multiplexed data stream subgroups, each of which contains one or more services (e.g., HBO®, Cinemax®, pay-per-view events, or the like); an all-inclusive program association table (PAT) identified by a unique (first) packet identifier (PID); an all-inclusive protocol base PID stream identified by a unique (second) PID; one or more hidden PATs each identified by a unique PID chosen from a first set of PIDS and associated with an allowable pre-defined combination of the multiplexed data stream subgroups; and a unique hidden protocol data (HPD) base PID stream corresponding to each hidden PAT, each HPD base PID stream identified by a unique PID chosen from a second set of PIDs.

A processor associated with the transcoder may be provided to receive the all-inclusive PAT, the all-inclusive protocol base PID stream, the hidden PATs, and the HPD base PID streams from the transcoder. The all-inclusive PAT and the all-inclusive protocol base PID stream correspond to all the services contained within the inbound data stream. Each hidden PAT and each corresponding HPD base PID stream relate to only those services contained in one associated pre-defined subgroup combination.

One hidden PAT may be selected (e.g., by the processor) which corresponds to a desired combination of multiplexed data stream subgroups. The protocol data makeup of the desired multiplexed data stream subgroup combination may then be determined (e.g., at the processor) from the HPD base PID stream which corresponds to the selected hidden PAT. The all-inclusive PAT and all-inclusive base PID stream, any unused hidden PATs and HPD base PID streams, and any subgroups which are not to be included in the reduced outbound multiplex may then be discarded, so that any services which are not to be included in the outbound multiplex are removed, along with certain information associated therewith. The selected PAT may be re-mapped to a first predetermined PID. The HPD base PID stream corresponding to the selected hidden PAT may be re-mapped to a second predetermined PID. The re-mapping may be performed, e.g., by the transcoder in association with the processor. The re-mapped PAT and the re-mapped HPD base PID stream may be output from the transcoder with the desired multiplexed data stream subgroup combination.

The first predetermined PID may be the PID of the all-inclusive PAT. Thus, for example, the PID of the selected hidden PAT may be re-mapped to PID 0X0000 of the all-inclusive PAT. The second predetermined PID may comprise the PID of the protocol base PID stream. Thus, for example, the PID of the HPD base PID stream corresponding to the selected hidden PAT may be re-mapped to the base PID of the all-inclusive protocol base PID stream. It should be appreciated, however, that any desired PID could alternatively be used for either of the predetermined PIDs, and there is no requirement to use any particular PID value for this purpose.

In the inbound data stream, the hidden PATs and HPD base PID streams may be carried in the same PAT stream as the all-inclusive PAT. However, each or any of the all-inclusive PAT (and the associated all-inclusive protocol base PID stream), the hidden PATs, or the HPD base PID streams may be carried in separate streams.

The inbound multiplexed data stream may comprise a plurality of multiplexed data streams, each of which may carry a plurality of services. The plurality of multiplexed data streams may be from a plurality of sources. The plurality of sources may, for example, comprise two or more satellite feeds.

The inbound multiplexed data stream may be a data stream adhering to a Moving Picture Experts Group (MPEG) standard or the like. The inbound multiplexed data stream may be a high data rate stream carried on a multiphase carrier having I and Q phases. A first plurality of subgroups may be carried in the I phase and a second plurality of subgroups may be carried in the Q phase. The all-inclusive PAT may consist of two separate PATs, an all-inclusive I phase PAT carried in the I phase which corresponds to all services carried in the I phase and an all-inclusive Q phase PAT carried in the Q phase which corresponds to all services carried in the Q phase. Similarly, the all-inclusive protocol base PID stream may consist of two separate protocol base PID streams, such that each phase may have an all-inclusive protocol base PID stream associated with each all-inclusive PAT. For example, the I phase may have an all-inclusive I phase protocol base PID stream associated with the all-inclusive I phase PAT. The Q phase may likewise have an all-inclusive Q phase protocol base PID stream associated with the all-inclusive Q phase PAT.

Alternately, the inbound multiplexed data stream may be a high data rate stream carried on one of a QPSK carrier, a vestigial sideband (VSB) carrier, or the like.

The transcoder may output an intermediate frequency data stream having a maximum data rate of about 27 Mbps (e.g., for use in a 64 Quadrature Amplitude Modulated (QAM) cable system). Alternately, the transcoder may output an intermediate frequency data stream having a maximum data rate of about 38.8 Mbps (e.g., for use in a 256 QAM cable system). Of course, any other desired data rate required by the system over which the data is communicated may also be used.

Each HPD base PID stream may contain at least one of a system time table (SST), ratings region tables (RRTs), a master guide table (MGT), and a virtual channel table (VCT) for only those services present in the associated multiplexed data stream subgroup combination. The MGT may list every event information table (EIT) and event text table (ETT) in the inbound multiplexed data stream. The EITs and ETTs may be retrieved from throughout the multiplexed data stream and passed as output with the selected multiplexed data stream subgroup combination. Each EIT and each ETT may have a unique PID.

In an example embodiment, the protocol data may comprise program service information protocol (PSIP) data.

An encoder may also be provided for constructing the inbound multiplexed data stream which is to be reduced. The encoder may receive a plurality of data streams, each carrying a service. A processor associated with the encoder may generate a protocol data set defining the plurality of data streams. Combinations of the plurality of data streams may be defined by the processor. The processor may then create one or more hidden protocol data sets, each hidden protocol data set may be associated with one of the defined combinations of the plurality of data streams. The encoder may then combine the protocol data set defining the plurality of data streams, the one or more hidden protocol data sets, and the plurality of data streams to create a multiplexed data stream.

In a further example embodiment, the encoder may receive a plurality of multiplexed data stream subgroups (e.g., from various service providers). Each multiplexed data stream subgroup may contain a plurality of services (e.g., HBO®, HBO®2, HBO®3, and the like). Each service may be carried as a packet stream having its own PID.

A processor associated with the encoder creates an all-inclusive PAT identified by a unique first PID and an associated all-inclusive protocol base PID stream, identified by a unique second PID. The all-inclusive PAT and all-inclusive protocol base PID stream correspond to all the services contained in the plurality of data stream subgroups. The processor also defines a plurality of data stream subgroup combinations and creates for each defined combination of data stream subgroups a hidden PAT, each of which has a unique PID chosen from a first set of PIDs. The processor also creates a hidden protocol data (HPD) base PID stream corresponding to each hidden PAT, each HPD base PID stream being identified by a unique PID chosen from a second set of PIDs. Each hidden PAT and its associated HPD base PID stream corresponds to the services contained in a respective combination of data stream subgroups. The encoder combines the all-inclusive PAT, the all-inclusive protocol base PID stream, the hidden PATs, the HPD base PID streams, and the data stream subgroups to create a multiplexed data stream.

DETAILED DESCRIPTION OF THE INVENTION

Figure 1:
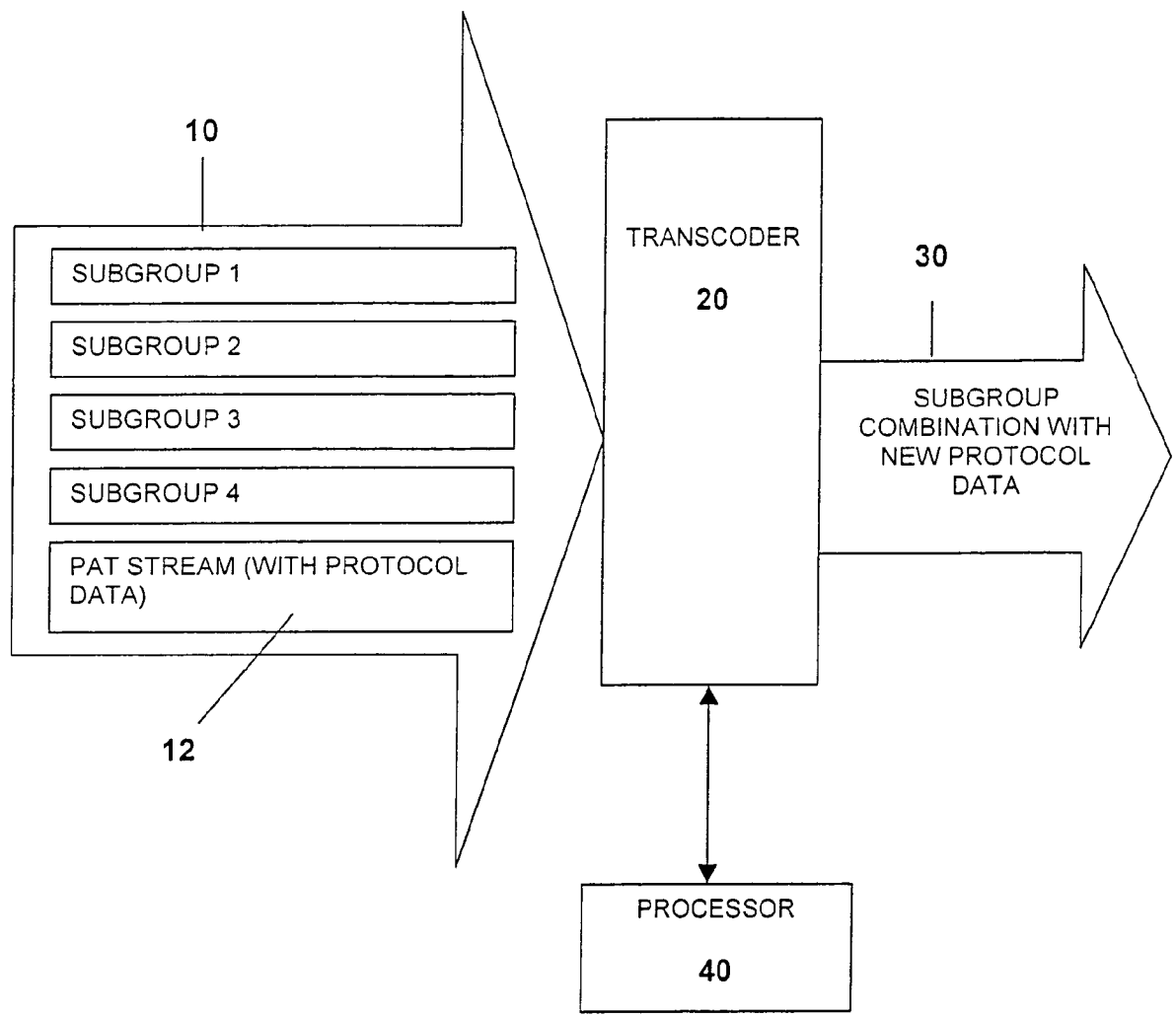
FIG. 1 is a block diagram of an illustrative embodiment of the invention.

In an example embodiment of the invention as shown in FIG. 1, protocol data is reconfigured when reducing a multiplexed data stream 10. A transcoder 20 is provided which receives the inbound multiplexed data stream 10. The inbound multiplexed data stream 10 may contain a plurality of pre-defined multiplexed data stream subgroups (e.g., subgroup 1, subgroup 2, subgroup 3, and subgroup 4). Each multiplexed data stream subgroup may carry a plurality of services (e.g., HBO®, Cinemax®, pay-per-view events, or the like).

Figure 2:
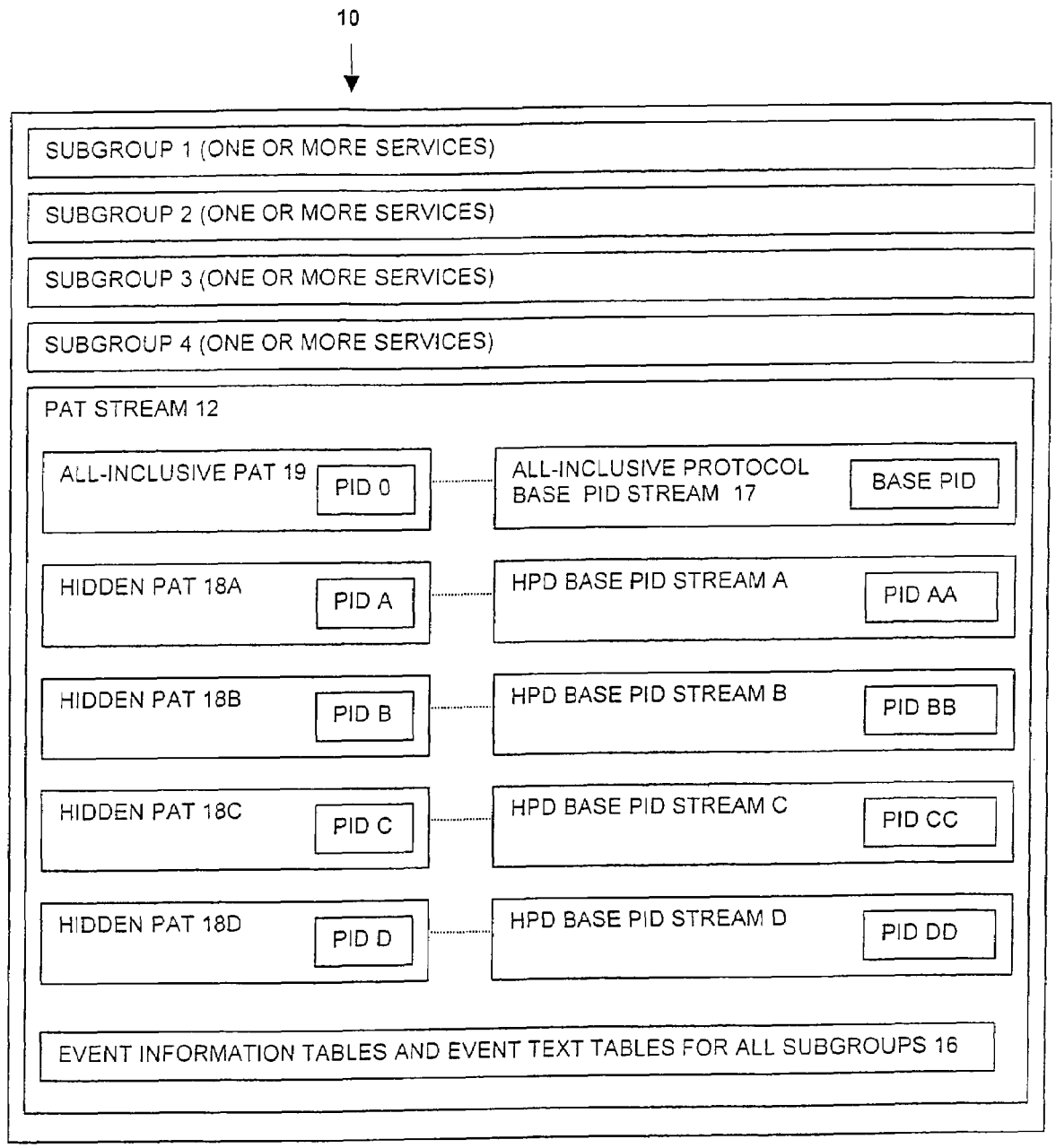
FIG. 2 is a block diagram example of an inbound data stream.

As shown in FIG. 2, the inbound multiplexed data stream 10 may also contain: an all-inclusive program association table (PAT) 19 having a (first) unique packet identifier (PID) (e.g., PID 0); an all-inclusive protocol base PID stream 17 identified by a (second) unique PID (e.g., base PID=0x1FFB); one or more hidden program association tables (PAT) 18A, 18B, 18c, and 18D, each identified by a unique PID from a first set of PIDs (e.g., PID A, PID B, PID C, PID D) and associated with an allowable predefined combination of the multiplexed data stream subgroups; and a unique hidden protocol data (HPD) base PID stream (HPD base PID stream A, HPD base PID stream B, HPD base PID stream C, and HPD base PID stream D) corresponding to each hidden PAT (18A, 18B, 18C, and 18D respectively) and identified by a unique pre-defined PID from a second set of PIDs (PID AA, PID BB, PID CC, and PID DD respectively).

As shown in FIG. 1, a processor 40 associated with the transcoder 20 may be provided to receive the all-inclusive PAT and all-inclusive base PID stream, the hidden PATs, and the HPD base PID streams from the transcoder 20. One hidden PAT may be selected (e.g., by the processor 40) which corresponds to a desired combination of multiplexed data stream subgroups. The protocol data makeup of the desired multiplexed data stream subgroup combination may then be determined (e.g., at the processor 40) from an HPD base PID stream which corresponds to the selected hidden PAT. The all-inclusive PAT and all-inclusive base PID stream, any unused hidden PATs and HPD base PID streams, as well as any subgroups not contained in the desired multiplexed data stream subgroup combination may then be discarded. By discarding the all-inclusive base PID stream, the unused hidden PATs and HPD base PID streams, and the unselected subgroups, the services which are not to be included in the reduced outbound multiplex are removed, along with any associated data.

The selected PAT may be re-mapped to a first predetermined PID. The HPD base PID stream corresponding to the selected hidden PAT may be re-mapped to a second predetermined PID. The re-mapping may be performed, e.g., by the transcoder 20 in response to commands from the processor 40. The re-mapped PAT and the re-mapped HPD base PID stream may be output from the transcoder 20 with the selected multiplexed data stream subgroup combination (shown at 30).

FIGS. 1 and 2 show an inbound data stream 10 having four predefined multiplexed data stream subgroups (subgroup 1, subgroup 2, subgroup 3, and subgroup 4). However, the inbound multiplexed data stream 10 may have any number of subgroups, depending on the number of services, the data rate of each subgroup and the data rate of the inbound multiplexed data stream 10. More specifically, there can be as many subgroups as desired, as long as the combined data rate of all of the subgroups and the PAT stream 12 does not exceed the allowed data rate for the multiplexed data stream 10. The subgroup combinations can comprise one or more of the subgroups provided. Any number of predetermined subgroup combinations can be provided for, depending on, for example, the number of subgroups provided, the data rate of each subgroup, and the desired data rate of the output from the transcoder 20.

FIG. 2 illustrates an example of the contents of the inbound multiplexed data stream 10. In FIG. 2, inbound data stream 10 is shown as containing four (4) subgroups (subgroup 1, subgroup 2, subgroup 3, and subgroup 4) each carrying, for example, one or more services, together with PAT stream 12. PAT stream 12 is shown as carrying all-inclusive PAT 19 having PID 0 and a corresponding all-inclusive protocol base PID stream 17 having base PID (e.g., PID=0x1FFB). Pat stream 12 also carries hidden PATs 18A, 18B, 18C, and 18D, each of which correspond to one predefined subgroup combination. Hidden PATs 18A, 18B, 18C, and 19D are each shown as having a unique PID (e.g., PID A, PID B, PID C, and PID D respectively). In addition, the PAT stream 12 is also shown as carrying four HPD base PID streams, each of which correspond to one hidden PAT (e.g., HPD base PID stream A, HPD base PID stream B, HPD base PID stream C, and HPD base PID stream D corresponding respectively to hidden PATs 18A, 18B, 18C, and 18D as shown by the dashed lines in FIG. 2). Each HPD base PID stream is identified by a unique PID (e.g., PID AA, PID BB, PID CC, and PID DD corresponding to HPD base PID streams A, B, C, and D respectively).

PAT stream 12 of the inbound data stream 10 is shown as carrying the all-inclusive PAT 19 and the all-inclusive protocol base PID stream 17, as well as the hidden PAT streams 18A, 18B, 18C, and 18D, and the HPD base PID streams A, B, C, and D. However, each or any of the all-inclusive PAT, the associated all-inclusive protocol base PID stream 17, the hidden PATs, or the HPD base PID streams may be carried in the inbound data stream 10 as a separate stream in the multiplex. The number of hidden PATs carried in the inbound multiplexed data stream 10 will depend upon the number of predetermined subgroup combinations, each hidden PAT corresponding to one predetermined subgroup combination. The subgroup combinations may provide respective output data streams having different data rates.

For example, if each predetermined subgroup combination is predefined to contain three subgroups each, there would be four possible different subgroup combinations available from the subgroups 1, 2, 3, and 4 carried in the inbound data stream 10 of FIG. 2, and therefore four hidden PATs 18A, 18B, 18C, and 18D would be carried in PAT stream 12 as shown (Hidden PATs 18A, 18B, 18C, and 18D). In this example, each hidden PAT would correspond to a three subgroup combination. In certain circumstances, it may be desirable to output all services contained in the inbound multiplex 10 without reduction. In such a situation, the inbound multiplex data stream 10 may be passed, without reduction, through the transcoder 20 for output.

As shown in FIG. 2, the HPD base PID streams (HPD base PID streams A-D) require the existence of hidden PATs (hidden PATs 18A-18D) and well-defined combinations of multiplexed subgroups in the inbound multiplexed data stream. As discussed, when the subgroups are combined in certain predetermined ways an output data stream 30 at a desired data rate may be produced.

The transcoder 20 may provide an output data stream 30 at a maximum data rate of about 27 Mbps and at a desired intermediate frequency (e.g., for use in a 64 QAM cable system). Alternately, the transcoder 20 may provide an output data stream having a maximum data rate of about 38.8 Mbps (e.g., for use in a 256 QAM cable system). A receiver will then obtain the output data stream 30 at the intermediate frequency for processing and ultimate use by a subscriber.

A HPD base PID stream is provided for each allowable predefined data stream subgroup combination. Each HPD base PID stream corresponds to the services provided by the associated subgroup combination.

The PID of the selected hidden PAT may be re-mapped to the PID of the all-inclusive PAT (e.g., PID 0). The PID of the HPD base PID stream corresponding to the selected hidden PAT may be re-mapped to the PID of the protocol base PID stream 17 (e.g., base PID=0x1FFB).

The inbound multiplexed data stream 10 may comprise a plurality of multiplexed data streams from a plurality of different sources. The plurality of sources may comprise, for example, two or more satellite feeds.

The inbound multiplexed data stream 10 may be an MPEG data stream. The inbound data stream 10 may be communicated using a multiphase carrier having an I phase and a Q phase. A first plurality of subgroups may be carried in the I phase and a second plurality of subgroups may be carried in the Q phase. Alternately, the inbound multiplexed data stream 10 may be a high data rate stream carried on a QPSK modulated carrier, a VSB modulated carrier, or the like. For example, the inbound multiplexed data stream 10 may be a QSPK modulated data stream comprised of two separate multiplexes, a first multiplex carried on the I phase and a second multiplex carried on the Q phase. Those skilled in the art will recognize that other modulation techniques may be used without departing from the scope of the claimed invention.

The protocol data may comprise program service information protocol (PSIP) data. In such an embodiment, the HPD base PID streams will contain PSIP data corresponding to the services carried in the associated subgroup combination.

Figure 3:
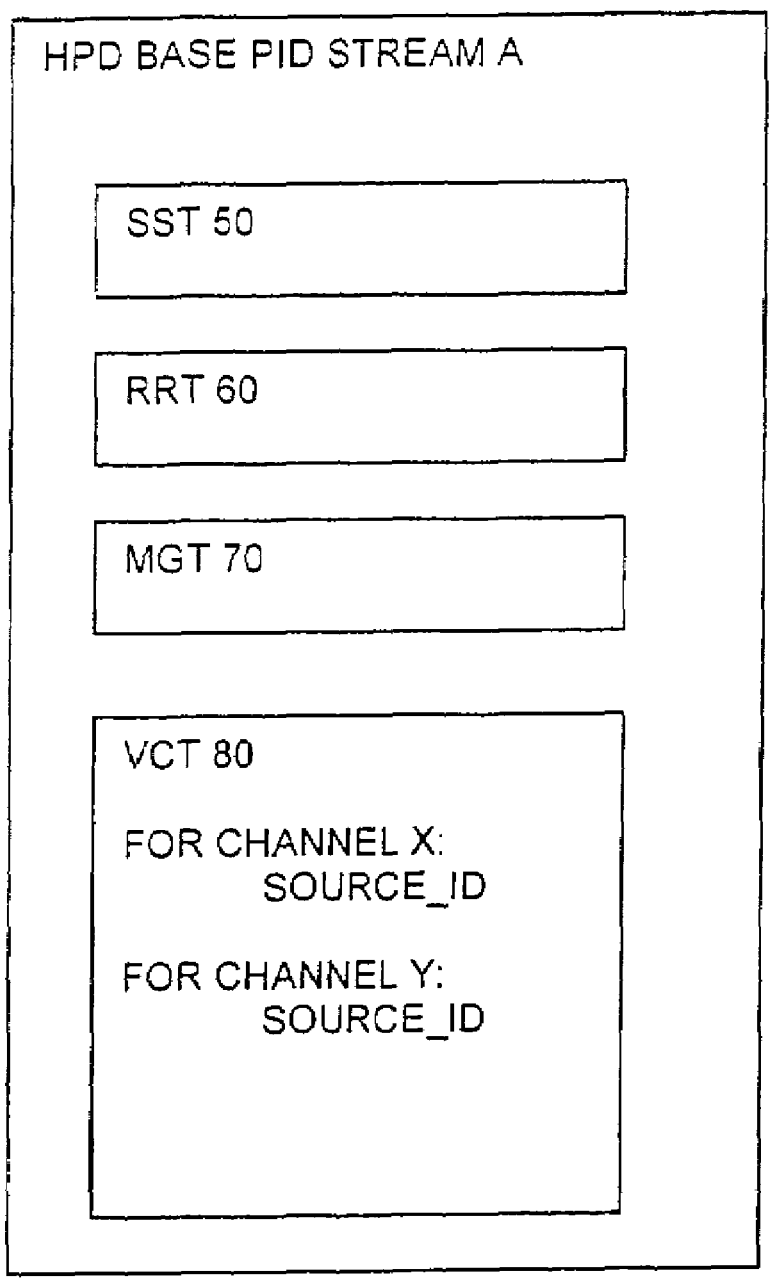
FIG. 3 is a block diagram example of an HPD base PID stream.

As shown in FIG. 3, each HPD base PID stream containing PSIP data (e.g., HPD base PID stream A) may include at least one of a system time table (SST) 50, a rating region table (RRT) 60, a master guide table (MGT) 70, and a virtual channel table (VCT) 80 for only those services present in the selected multiplexed data stream subgroup combination. The MGT 70 may list every event information table (EIT) and event text table (ETT) carried in the inbound multiplexed data stream 10. The EITs and ETTs are carried in the inbound multiplexed data stream 10 as shown at 16 in FIG. 2. All EITs and ETTs may be retrieved from throughout the multiplexed data stream 10 and passed as output with the selected multiplexed data stream subgroup combination 30. Each EIT and each ETT may have a unique PID.

Figure 4:
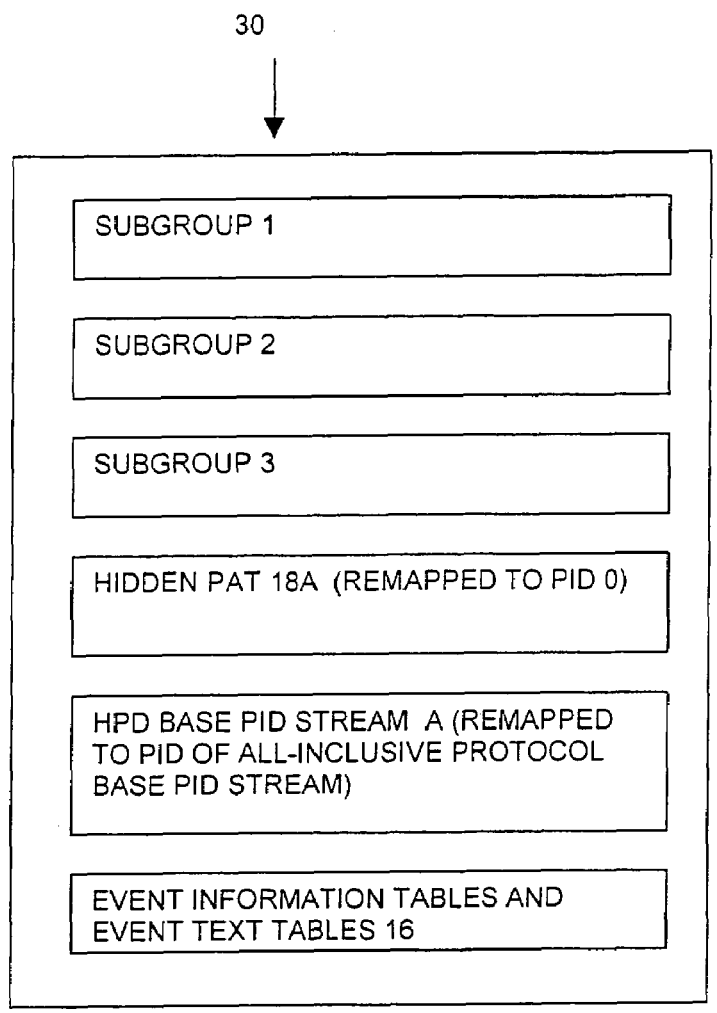
FIG. 4 is a block diagram example of a reduced outbound data stream.

FIG. 4 shows an example of the contents in the reduced outbound data stream 30, where the combination of subgroups 1, 2, and 3 is chosen. Hidden PAT 18A, for example, may be defined to correspond to the subgroup combination of subgroups 1, 2, and 3. Hidden PAT 18A is shown as having been remapped to a first predetermined PID, e.g., PID 0 as shown. The outbound data stream 30 also contains the HDP base PID stream corresponding to the selected hidden PAT. In this example HPD base PID stream A is shown as corresponding to hidden PAT 18A. HPD base PID stream A is shown as being re-mapped to a second predetermined PID, e.g., the base PID of the all-inclusive protocol base PID stream. The HPD base PID stream content is described above in connection with FIG. 3. The outbound data stream 30 is also shown as carrying all the EITs and ETTs 16 corresponding to all the services carried in the inbound data stream 10. Alternately, only those EITs and ETTs relevant to the services provided in the reduced outbound multiplexed data stream 30 may be carried therein, as any unused ETTs and EITs may be discarded with the unused PAT information and unused subgroups as discussed above.

Figure 5:
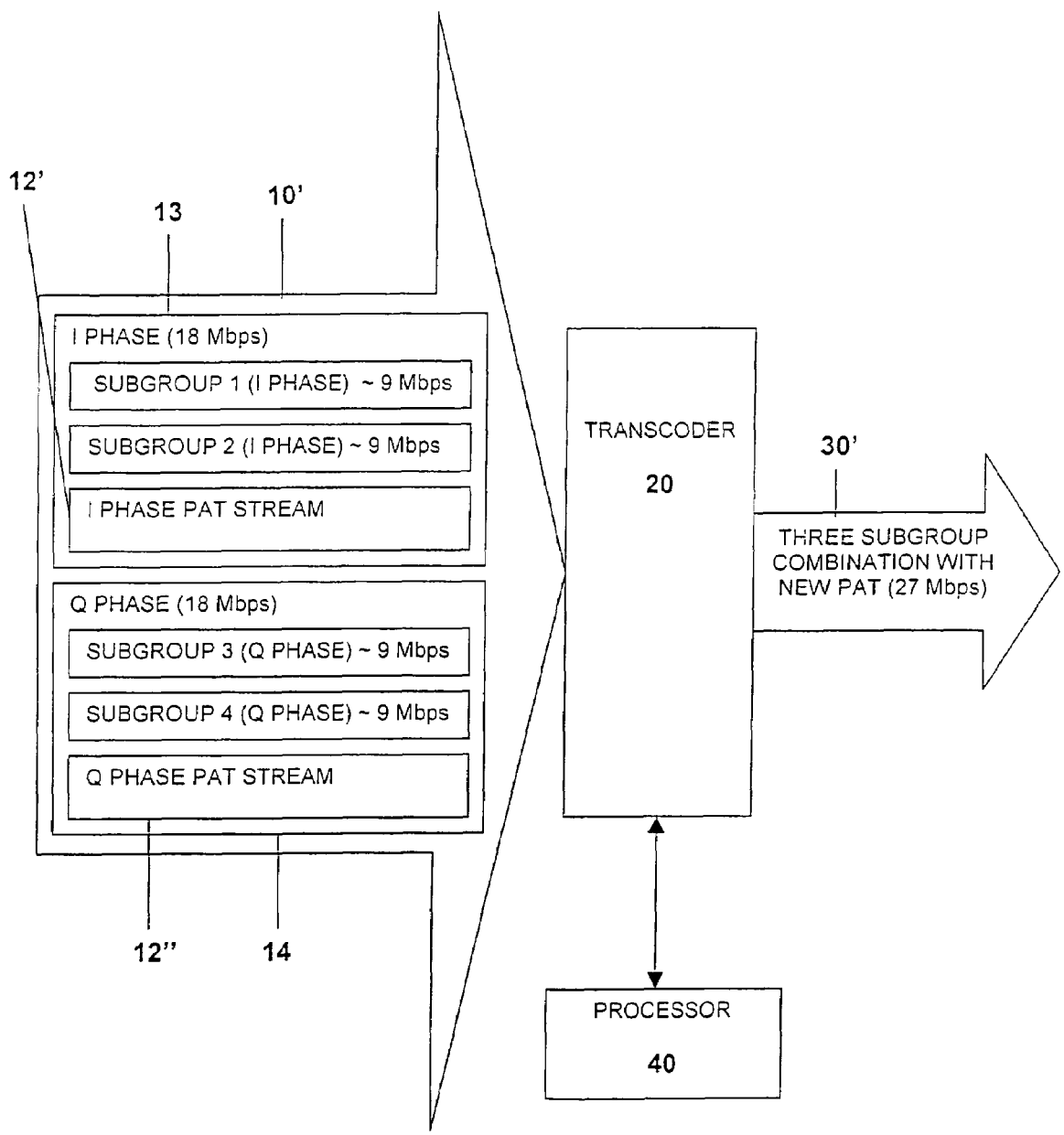
FIG. 5 is a block diagram of an example embodiment of the invention.

A specific example embodiment of the invention is shown in FIG. 5, which is applicable, e.g., to a 64 QAM cable system. The inbound multiplexed data stream 10' may be, for example, a 36 Mbps QPSK data stream composed of two 18 Mbps phases, in particular, an I phase 13 and a Q phase 14. I and Q are each composed of two subgroups of approximately 9 Mbps each. FIG. 5 shows the I phase 13 having subgroups 1 and 2 and the Q phase 14 having subgroups 3 and 4. This example implementation provides a datapipe carrying a total of four subgroups at a total data rate of approximately 36 Mbps. The I and Q phase may each have a separate all-inclusive PAT and a separate all-inclusive protocol base PID stream, which provide data relating to all of the services carried in that particular phase. Where a reduced multiplex having up to three of the four original subgroups is to be generated, the output of the transcoder 20 (e.g., for cable-side transmission in a 64 QAM cable system) is a maximum of ¾ of the 36 Mbps input, or approximately 27 Mbps.

Figure 6:
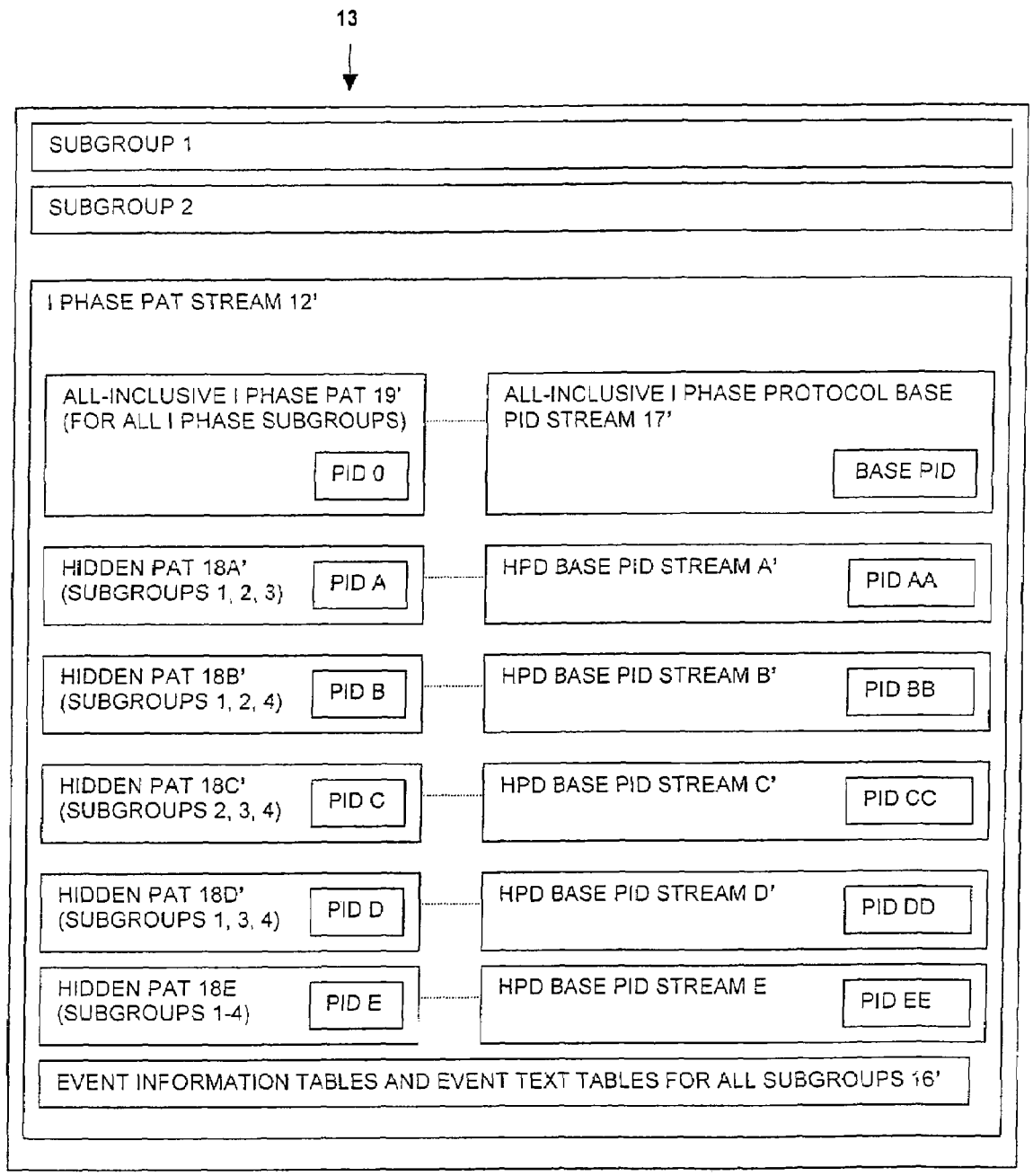
FIG. 6 is a block diagram of an example of one phase of an inbound data stream.

FIG. 6 shows an example of the contents of the I phase 13 of the incoming data stream 10' of FIG. 3. The I phase 13 is shown as carrying subgroups 1 and 2, as well as PAT stream 12'. PAT stream 12' includes an all-inclusive I phase PAT 19' and an all-inclusive I phase protocol base PID stream 17', which correspond to the services carried in the I phase 13. PAT stream 12' also carries hidden PATs (e.g., hidden PATs 18A', 18B', 18C', 18D' and 18E), which identify the services carried in predefined combinations of subgroups 1, 2, 3, and 4. In addition, PAT stream 12' carries HPD base PID streams A', B', C' D' and E, which correspond respectively to hidden PATs 18A', 18B', 18C', 18D', and 18E. As shown in FIG. 5, the Q phase 14 carries a PAT stream 12'', which includes an all-inclusive Q phase PAT and an all-inclusive Q phase protocol base PID stream which correspond to the services carried in the Q phase 14. If desired, the hidden PATs and HPD base PID streams could also be carried in the Q phase 14 in PAT stream 12". Further, as discussed above, the all-inclusive PAT information and all-inclusive protocol base PID information may be carried in either or both of the I and Q phases separate and apart from the hidden PATs and HPD base PID streams.

In the example shown in FIGS. 5 and 6, four different combinations of three subgroups are possible, each providing for an output of about 27 Mbps. The four possible subgroup combinations are: combination 1, 2, and 3; combination 1, 3, 4; combination 1, 2, 4; and combination 2, 3, and 4. Accordingly, four hidden PATS 18A', 18B', 18C', and 18D' are provided, which correspond to the four possible subgroup combinations of three subgroups. Each such hidden PAT, together with its corresponding HPD base PID stream (e.g., HPD base PID streams A', B', C', D' respectively) contain data relating only to the services contained in the corresponding three-subgroup combination. In addition, a fifth hidden PAT 18E and corresponding HPD base PID stream E may be provided, which correspond to the combination of all data stream subgroups (subgroups 1-4). The fifth hidden PAT 18E may contain the combined data from the all-inclusive I phase PAT 19' from the I phase and the all-inclusive Q phase PAT contained in PAT stream 12" of the Q phase, since all four subgroups contained in both phases of the inbound multiplexed data stream 10' are being passed as output by the transcoder 20. Similarly, the HPD base PID stream E corresponding to the fifth hidden PAT 18E may contain the combined data from the all-inclusive I phase protocol base PID stream 17' from the I phase and the all-inclusive Q phase protocol base PID stream contained in PAT stream 12" of the Q phase (FIG. 5). However, in the event the fifth hidden PAT 18E is used, the transcoder and downstream communications channel will have to accommodate the combined data rate of all four subgroups, e.g., 36 Mbps in the event that each subgroup comprises a data stream with a data rate of about 9 Mbps.

The transcoder 20 (in cooperation with processor 40 associated therewith) will select one hidden PAT, re-map the selected hidden PAT and corresponding HPD base PID stream to predetermined PIDS, and pass the re-mapped hidden PAT and re-mapped HPD base PID stream, along with the subgroups they represent, to the output, all as described above in connection with FIG. 1.

In this manner, an incoming multiplexed data stream 10' with a data rate of approximately 36 Mbps may be reduced to an outbound data stream 30' having a data rate of approximately 27 Mbps, which contains new protocol data identifying the services provided therein for use in a 64 QAM cable system. Additionally, the example provided is able to produce an outbound data stream having a data rate of approximately 36 Mbps for use in a 256 QAM cable system if the hidden PAT corresponding to the combination of all four data stream subgroups is selected (i.e. fifth hidden PAT 18E).

Although a 256 QAM cable system is defined to run at a data rate of 38.8 Mbps, those skilled in the art will appreciate that a four subgroup combination output which generates approximately 36 Mbps can be used in a 256 QAM cable system, as it is within the standard capability of the transcoder 20 (or similar devices which provide the re-multiplexing function) to insert additional null packets into the multiplexed stream in order to provide the required 38.8 Mbps data rate. Similarly, the transcoder 20 may insert null packets into the outbound data stream 30 or 30' whenever the data rate of the outbound data stream is below the data rate required for the particular system.

Those skilled in the art will appreciate that the inbound multiplexed data stream 10' may have any number of subgroups, as well as any number of combinations thereof having varying data rates. Hidden PATs may be provided which correspond to different combinations of different numbers of subgroups, depending upon the output data rate required, such that the invention can be used in various types of cable systems.

Figure 7:
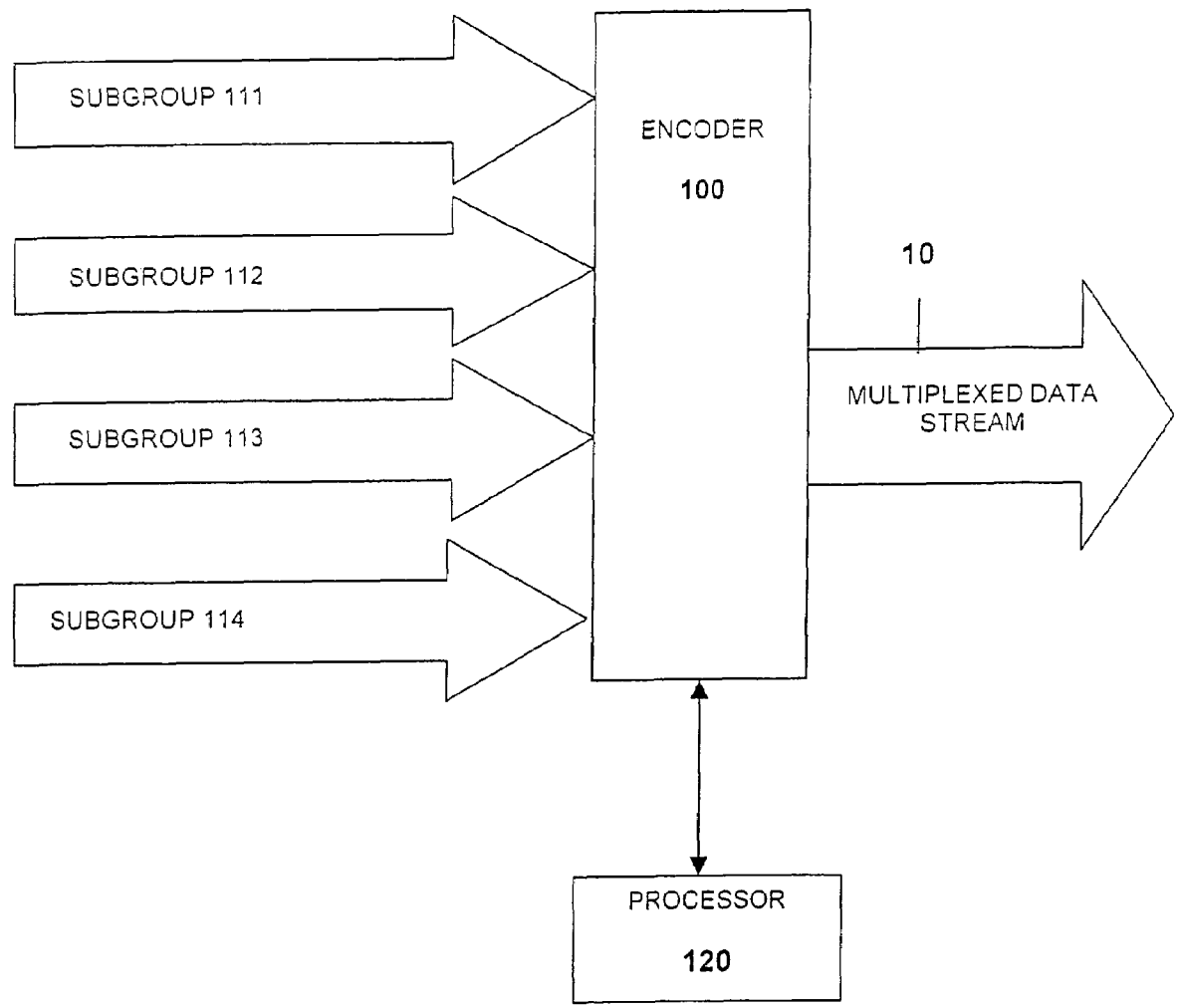
FIG. 7 is a block diagram of an illustration of the formation of the inbound multiplexed data stream.

As shown in FIG. 7, an encoder 100 may also be provided for constructing the inbound multiplexed data stream 10 which is to be reduced. The encoder 100 receives a plurality of multiplexed data stream subgroups 111, 112, 113, 114 (e.g., from various service providers). Each multiplexed data stream subgroup may contain a plurality of services (e.g., HBO®, HBO®2, HBO®3, and the like). Each service may be carried as a packet stream having its own PID.

A processor 120 associated with the encoder 100 creates an all-inclusive PAT identified by a unique first PID and an associated all-inclusive protocol base PID stream, identified by a unique second PID. The all-inclusive PAT and all-inclusive protocol base PID stream correspond to all the services contained in the plurality of data stream subgroups 111, 112, 113, 114. The processor 120 also defines a plurality of data stream subgroup combinations and creates for each defined combination of data stream subgroups a hidden PAT, each of which has a unique PID chosen from a first set of PIDS. The processor also creates a hidden protocol data (HPD) base PID stream for each hidden PAT, each HPD base PID stream being identified by a unique PID chosen from a second set of PIDs. Each hidden PAT and its associated HPD base PID stream corresponds to the services contained in a respective combination of data stream subgroups. The encoder 100 combines the all-inclusive PAT, the all-inclusive protocol base PID stream, the hidden PATs, the HPD base PID streams, and the data stream subgroups to create the multiplexed data stream 10.

The present invention may be implemented using a combination of hardware and software.

It should now be appreciated that the invention provides advantageous methods and apparatus which allow a cable or satellite television headend decoder/transcoder to create and output protocol data which correctly corresponds to the services carried in a reduced data stream (e.g., for cable-side transmissions). The present invention is particularly useful when reducing high data rate data streams (e.g., in excess of 27 Mbps) for cable-side transmission.

Although the invention has been described in connection with various illustrated embodiments, numerous modifications and adaptations may be made thereto without departing from the spirit and scope of the invention as set forth in the claims.

What is claimed is:

1. A method for reconfiguring protocol data when reducing a multiplexed data stream, comprising:
   receiving at a transcoder an inbound multiplexed data stream having:
   (1) a plurality of data streams, each of which carries a service;
   (2) a protocol data set defining the plurality of data streams; and
   (3) one or more hidden protocol data sets, each hidden protocol data set associated with a predefined combination of the plurality of data streams;
   selecting one of said hidden protocol data sets corresponding to a desired combination of data streams; and
   outputting the desired combination of data streams and the selected hidden protocol data set;
   wherein:
   said protocol data set defining the plurality of data streams comprises:

an all-inclusive program association table (PAT) identified by a first packet identifier (PID); and an all-inclusive protocol base PID stream identified by a second PID;

each of said hidden protocol data sets comprises:

a hidden PAT associated with one of said predefined combinations of the plurality of data streams and identified by a PID chosen from a first group of PIDs; and a hidden protocol data (HPD) base PID stream corresponding to the hidden PAT, each HPD base PID stream identified by a PID chosen from a second group of PIDs.

2. A method in accordance with claim 1, wherein:

said selecting of one of the hidden protocol data sets comprises selecting one hidden PAT corresponding to the desired combination of data streams.

3. A method in accordance with claim 2, further comprising:

determining a protocol data makeup of the desired combination of data streams from the HPD base PID associated with the selected hidden PAT;

re-mapping the selected hidden PAT to a first predetermined PID; and re-mapping the HPD base PID stream corresponding to the selected hidden PAT to a second predetermined PID;

wherein the re-mapped PAT and the re-mapped HPD base PID stream are output with the desired combination of data streams.

4. A method in accordance with claim 3, wherein:

the first predetermined PID is the PID of the all-inclusive PAT; and the second predetermined PID is the PID of the all-inclusive protocol base PID stream.

5. A method in accordance with claim 1, wherein the plurality of data streams are from a plurality of sources.

6. A method in accordance with claim 5, wherein:

the plurality of data streams comprise a plurality of multiplexed data stream subgroups; and each hidden protocol data set is associated with a predefined combination of the multiplexed data stream subgroups.

7. A method in accordance with claim 1, wherein the desired combination of data streams and the selected hidden protocol data set are output in an intermediate frequency data stream having one of: (i) a maximum data rate of about 27 Mbps; or (ii) a maximum data rate of about 38.8 Mbps.

8. A method in accordance with claim 1, wherein each hidden protocol data set contains at least one of a system time table (SST), ratings region table (RRT), a master guide table (MGT), and a virtual channel table (VCT) for those services present in the associated combination of said plurality of data streams.

9. Apparatus for reconfiguring protocol data when reducing a multiplexed data stream, comprising:

a transcoder for receiving an inbound multiplexed data stream, said multiplexed data stream having:

(1) a plurality of data streams, each of which carries a service;

(2) a protocol data set defining the plurality of data streams; and (3) one or more hidden protocol data sets, each hidden protocol data set associated with a predefined combination of the plurality of data streams; and a processor associated with the transcoder, said processor configured to:

(a) receive the protocol data set defining the plurality of data streams and said one or more hidden protocol data sets;

(b) select one of said hidden protocol data sets corresponding to a desired combination of data streams; and (c) direct the transcoder to output the desired combination of data streams and the selected hidden protocol data set;

wherein:

said protocol data set defining the plurality of data streams comprises:

an all-inclusive program association table (PAT) identified by a first packet identifier (PID); and an all-inclusive protocol base PID stream identified by a second PID;

each of said hidden protocol data sets comprises:

a hidden PAT associated with one of said predefined combinations of the plurality of data streams and identified by a PID chosen from a first group of PIDs; and a hidden protocol data (HPD) base PID stream corresponding to the hidden PAT, each HPD base PID stream identified by a PID chosen from a second group of PIDs.

10. Apparatus in accordance with claim 9, wherein:

said selection of one of the hidden protocol data sets by the processor comprises a selection of one hidden PAT corresponding to the desired combination of data streams.

11. Apparatus in accordance with claim 10, wherein:

the processor determines a protocol data makeup of the desired combination of data streams from the HPD base PID associated with the selected hidden PAT;

the processor re-maps the selected hidden PAT to a first predetermined PID;

the processor re-maps the HPD base PID stream corresponding to the selected hidden PAT to a second predetermined PID; and the transcoder outputs the re-mapped PAT and the re-mapped HPD base PID stream with the desired combination of data streams.

12. Apparatus in accordance with claim 11, wherein:

the first predetermined PID is the PID of the all-inclusive PAT; and the second predetermined PID is the PID of the all-inclusive protocol base PID stream.

13. Apparatus in accordance with claim 9, wherein the plurality of data streams are from a plurality of sources.

14. Apparatus in accordance with claim 13, wherein:

the plurality of data streams comprise a plurality of multiplexed data stream subgroups; and each hidden protocol data set is associated with a predefined combination of the multiplexed data stream subgroups.

15. Apparatus in accordance with claim 9, wherein the transcoder outputs the desired combination of data streams and the selected hidden protocol data set in an intermediate frequency data stream having one of: (i) a maximum data rate of about 27 Mbps; or (ii) a maximum data rate of about 38.8 Mbps.

16. Apparatus in accordance with claim 9, wherein each hidden protocol data set contains at least one of a system time table (SST), ratings region table (RRT), a master guide table (MGT), and a virtual channel table (VCT) for those services present in the associated combination of said plurality of data streams.

* * * * *